(12) United States Patent
Kawatsu

(10) Patent No.: US 11,407,399 B2
(45) Date of Patent: Aug. 9, 2022

(54) HYBRID DRIVE DEVICE

(71) Applicant: AISIN CORPORATION, Aichi (JP)

(72) Inventor: Yutaro Kawatsu, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/420,180

(22) PCT Filed: Mar. 26, 2020

(86) PCT No.: PCT/JP2020/013871
§ 371 (c)(1),
(2) Date: Jul. 1, 2021

(87) PCT Pub. No.: WO2020/203706
PCT Pub. Date: Oct. 8, 2020

(65) Prior Publication Data
US 2022/0080946 A1    Mar. 17, 2022

(30) Foreign Application Priority Data

Mar. 29, 2019 (JP) .............................. JP2019-068908

(51) Int. Cl.
*B60W 20/10* (2016.01)
*B60W 10/06* (2006.01)
(Continued)

(52) U.S. Cl.
CPC .............. *B60W 20/10* (2013.01); *B60K 6/48* (2013.01); *B60W 10/06* (2013.01); *B60W 10/08* (2013.01);
(Continued)

(58) Field of Classification Search
CPC .......... B60W 20/10; B60W 6/08; B60W 6/11; B60W 2710/0677; B60W 2710/086;
(Continued)

(56) References Cited

U.S. PATENT DOCUMENTS 8,386,140 B2 * 2/2013 Tsuda ..................... B60W 10/11
701/84
8,738,254 B2 * 5/2014 Lee ....................... F16H 63/502
701/58
(Continued)

FOREIGN PATENT DOCUMENTS

JP    2003-182405 A    7/2003
JP    2006-205900 A    8/2006
(Continued)

OTHER PUBLICATIONS

International Search Report for PCT/JP2020/013871 dated Jun. 16, 2020 [PCT/ISA/210].

*Primary Examiner* — Tinh Dang
(74) *Attorney, Agent, or Firm* — Sughrue Mion, PLLC

(57) ABSTRACT

During shift control of a transmission mechanism, a hybrid drive device computes the amount of change in input torque (deTr) acting on the transmission mechanism and an input torque change time (t15), and controls a motor so that motor torque is changed by the amount of change in input torque (deTr), when the motor can change the amount of change in input torque (deTr), and outputs, when the motor cannot change the amount of change in input torque (deTr), an engine torque signal (Tesig1) at an engine torque change time (t14) earlier than the input torque change time (t15) at which drive power of the motor is changed when the motor can change the amount of change in input torque (deTr).

20 Claims, 6 Drawing Sheets

(51) Int. Cl.
*B60W 10/08* (2006.01)
*F16H 61/04* (2006.01)
*F16H 61/08* (2006.01)
*F16H 59/18* (2006.01)
*B60W 40/13* (2012.01)
*F16H 59/74* (2006.01)
*F16H 63/50* (2006.01)
*B60K 6/48* (2007.10)
*F16H 61/684* (2006.01)
*B60W 10/11* (2012.01)

(52) U.S. Cl.
CPC ............. *B60W 10/11* (2013.01); *F16H 59/74* (2013.01); *F16H 61/0437* (2013.01); *F16H 61/08* (2013.01); *F16H 61/684* (2013.01); *F16H 63/502* (2013.01); *B60K 2006/4825* (2013.01); *B60W 2710/0677* (2013.01); *B60W 2710/086* (2013.01); *B60W 2710/1033* (2013.01); *B60Y 2200/92* (2013.01); *F16H 2200/0052* (2013.01); *F16H 2200/2005* (2013.01); *F16H 2200/2043* (2013.01)

(58) Field of Classification Search
CPC ... B60W 2710/1033; B60W 2040/1323; F16H 59/74; F16H 61/0437; F16H 61/08; F16H 61/684; F16H 63/502; F16H 2200/0052; F16H 2200/2005; F16H 2200/2043; F16H 2059/186; F16H 2061/0496; B60K 2006/4825; B60Y 2200/92
See application file for complete search history.

(56) References Cited

U.S. PATENT DOCUMENTS

| | | | |
|---|---|---|---|
| 10,065,626 B2* | 9/2018 | Wang | B60W 10/08 |
| 10,272,908 B2* | 4/2019 | Kim | B60W 10/02 |
| 10,343,508 B2* | 7/2019 | Sugiyama | B60W 10/115 |
| 10,358,125 B2* | 7/2019 | Yamazaki | B60W 20/15 |
| 10,569,662 B2* | 2/2020 | Kumazaki | B60L 50/15 |

FOREIGN PATENT DOCUMENTS

| | | |
|---|---|---|
| JP | 2007-099265 A | 4/2007 |
| JP | 2009-154625 A | 7/2009 |

* cited by examiner

FIG. 3

|     | C1 | C2 | C3 | B1 | B2 |
|-----|----|----|----|----|----|
| P   |    |    |    |    |    |
| R   |    |    | ○  |    | ○  |
| N   |    |    |    |    | ○  |
| 1st | ○  |    |    |    | ○  |
| 2nd | ○  |    |    | ○  |    |
| 3rd | ○  |    | ○  |    |    |
| 4th | ○  | ○  |    |    |    |
| 5th |    | ○  | ○  |    |    |
| 6th |    | ○  |    | ○  |    |

HYBRID DRIVE DEVICE

CROSS REFERENCE TO RELATED APPLICATIONS

This application is a National Stage of International Application No. PCT/JP2020/013871 filed Mar. 26, 2020, claiming priority based on Japanese Patent Application No. 2019-068908 filed Mar. 29, 2019, the contents of which are incorporated by reference in their entirety.

TECHNICAL FIELD

This technique relates to a hybrid drive device that changes drive power of at least one of a rotating electrical machine and an engine during shift control of a transmission mechanism.

BACKGROUND ART

In recent years, there has been proposed a hybrid drive device including an engine and a rotating electrical machine (motor) as drive sources, and including a transmission mechanism that changes the speed of rotation of the drive sources (see Patent Literature 1). It is proposed that in the hybrid drive device of this Patent Literature 1, upon performing a shift by the transmission mechanism, inertial torque occurring with the shift is absorbed by regeneration of the motor, and when the entire inertial torque cannot be absorbed by the regeneration of the motor, torque reduction is performed by the engine.

CITATIONS LIST

Patent Literature

Patent Literature 1: JP 2003-182405 A

SUMMARY OF DISCLOSURE

Technical Problems

However, in the above-described hybrid drive device, upon performing torque reduction or torque increase by the engine when the entire inertial torque occurring upon shifting cannot be absorbed by the motor, when the motor cannot be used due to influence such as the remaining level of a battery, or the like, since it is premised to use the motor, an instruction is provided to the engine after the motor actually becomes unable to perform torque control, and thus, engine torque cannot be changed in time and a planned torque change cannot be obtained during the shift, causing problems such as a delay in shift and influence on shift feel.

Hence, this technique provides a hybrid drive device capable of changing drive power acting on a transmission mechanism at a computed drive power change time even when a rotating electrical machine cannot change drive power by the amount of change.

Solutions to Problems

The hybrid drive device includes:
a transmission mechanism that has an input member drive-coupled to an engine and an output member drive-coupled to wheels, and performs shift control for changing a transmission gear ratio between the input member and the output member;
a rotating electrical machine drive-coupled to the transmission mechanism; and
a control part that, during shift control of the transmission mechanism, computes a change time and an amount of change by which drive power acting on the transmission mechanism is changed, controls the rotating electrical machine so that drive power of the rotating electrical machine is changed by the amount of change, when the rotating electrical machine can change drive power by the amount of change, and outputs an engine instruction signal for changing drive power to the engine, when the rotating electrical machine cannot change drive power by the amount of change, and when the rotating electrical machine cannot change drive power by the amount of change, the control part outputs the engine instruction signal to the engine at a pre-change time earlier than a change time at which drive power of the rotating electrical machine is changed when the rotating electrical machine can change drive power by the amount of change.

By this, when the rotating electrical machine cannot change drive power by the amount of change, an engine instruction signal is outputted to the engine at a pre-change time earlier than a change time at which drive power of the rotating electrical machine is changed when the rotating electrical machine can change drive power by the amount of change, and thus, it becomes possible for the engine to change drive power acting on the transmission mechanism at a computed drive power change time, enabling a reduction in a delay in shift and influence on shift feel.

BRIEF DESCRIPTION OF DRAWINGS

FIG. 3 is an engagement table for the transmission mechanism according to the present embodiment.

DESCRIPTION OF EMBODIMENTS

The present embodiment will be described below using FIGS. 1 to 6. First, a schematic configuration of a hybrid drive device 1 according to the present embodiment will be described along with FIG. 1.

[Configuration of a Hybrid Drive Device]

Figure 1:
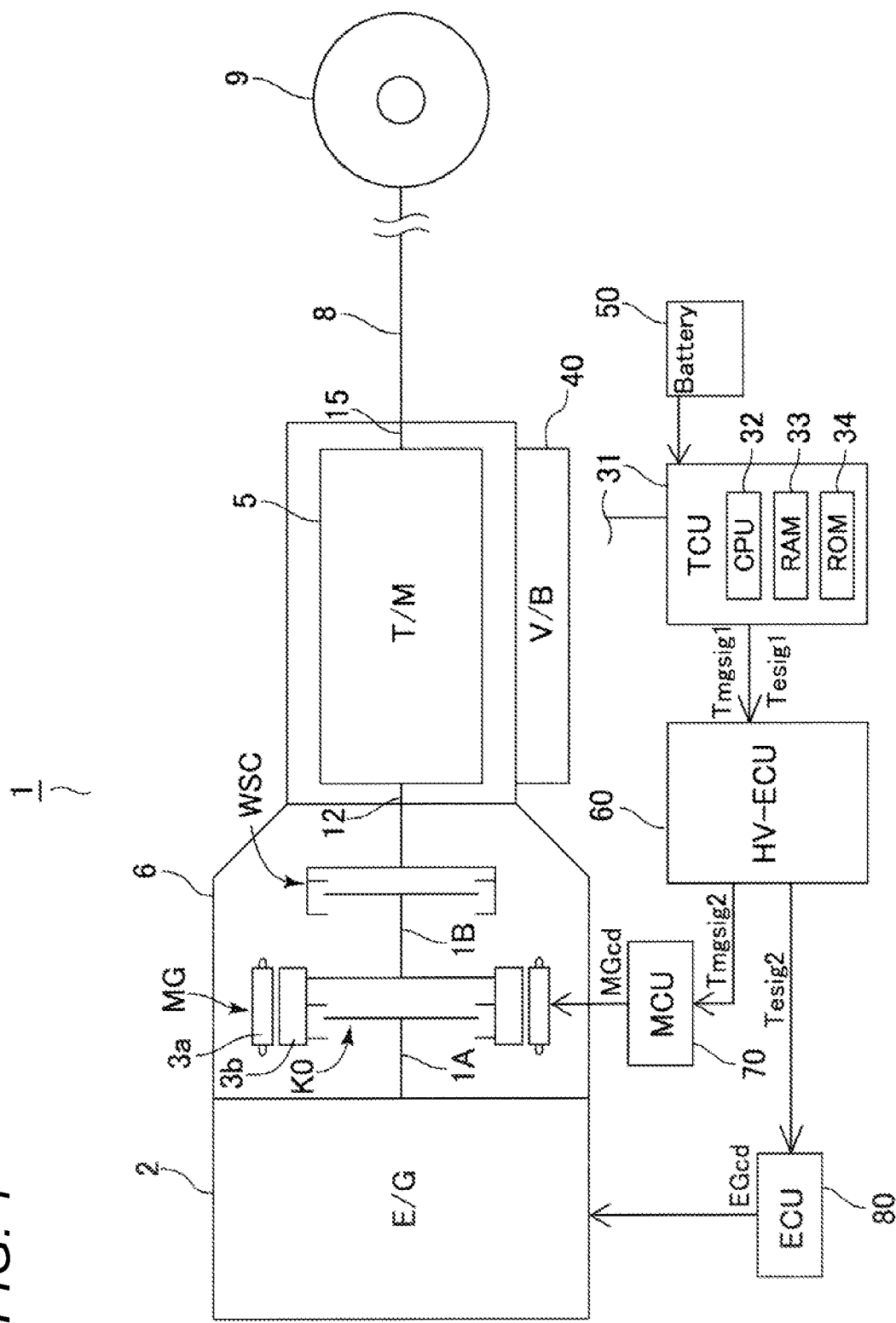
FIG. 1 is a block diagram showing a hybrid drive device according to the present embodiment.

As shown in FIG. 1, the hybrid drive device 1 is suitable for use in, for example, a front-engine, rear-wheel drive (FR) type vehicle, and an input shaft 1A is drive-coupled to an engine 2 serving as a drive source. In addition, the hybrid drive device 1 includes, inside a case 6, a rotating electrical machine (motor/generator) MG having a stator 3a and a rotor 3b and serving as a drive source; a transmission mechanism 5 provided on a power transfer path between the engine 2 and the motor MG and wheels 9; an oil pressure control device (V/B) 40 that hydraulically controls the transmission mechanism 5; a clutch K0 disposed between the engine 2 and the motor/generator (hereinafter, simply referred to as motor) MG on the power transfer path, and serving as an engine-disconnecting clutch that can disconnect the engine 2; a starter clutch (a starting friction engagement element and a drive transfer clutch) WSC that is disposed between the motor MG and the transmission mechanism 5 on the power transfer path, enables and disables power transfer between the engine 2 and the motor MG (i.e., the drive sources) and the transmission mechanism 5, and is engaged particularly at the start of a vehicle; and a transmission control part (hereinafter, referred to as "TCU") 31 serving as a first control part.

The TCU 31 includes a CPU 32, a RAM 33 that temporarily stores data, and a ROM 34 that stores a processing program, and is connected to a hybrid control part (hereinafter, referred to as "HV-ECU") 60 serving as a fourth control part that performs overall control of a hybrid vehicle having the hybrid drive device 1 mounted thereon. In addition, the HV-ECU 60 is connected to a motor control part (hereinafter, referred to as "MCU") 70 serving as a second control part that controls drive of the motor MG, and an engine control part (hereinafter, referred to as "ECU") 80 serving as a third control part that controls drive of the engine 2.

The TCU 31 outputs, from an output port thereof, various types of signals such as a control signal for each solenoid valve in the oil pressure control device 40, a control signal for controlling the engine 2 (including an engine torque signal which will be described later), and a control signal for controlling the motor MG (including a motor torque signal which will be described later). In addition, an input port of TCU 31 accepts, as input, detection signals from various types of sensors, etc., whose depiction is omitted and a detection signal from a battery 50. For example, the input port of the TCU 31 is configured to accept, as input, information such as the temperature of the motor MG, the remaining amount of electricity in the battery 50, and the temperature of the battery 50.

In addition, the above-described motor MG and clutch K0 are drive-coupled to the starter clutch WSC by a rotating shaft 1B, and the starter clutch WSC is drive-coupled to an input shaft 12 of the transmission mechanism 5. Note that, though depiction is omitted, normally, a damper device that transfers rotation of the engine 2 while absorbing pulsations of the engine 2, etc., are provided between the engine 2 and the clutch K0.

Specifically, the transmission mechanism (T/M) 5 which will be described later is a transmission mechanism that changes a transfer path based on the engagement states of a plurality of friction engagement elements (clutches and brakes) and can achieve, for example, six forward gears and a reverse gear. In addition, a propeller shaft 8 is drive-coupled to an output shaft 15 of the transmission mechanism 5, and rotation outputted to the propeller shaft 8 is transferred to the left and right wheels 9 through a differential device, etc.

Note that the transmission mechanism 5 may be, for example, a stepped transmission mechanism that achieves three to five forward gears or seven or more forward gears, or may be a continuously variable transmission mechanism such as a belt continuously variable transmission or a toroidal continuously variable transmission, i.e., the transmission mechanism 5 may be any transmission mechanism.

In the hybrid drive device 1 such as that described above, the clutch K0, the motor MG, the starter clutch WSC, and the transmission mechanism 5 are disposed in this order from an engine 2 side to a wheel 9 side, and when the vehicle travels by driving both of the engine 2 and the motor MG or the engine 2, the control part (TCU) 31 controls the oil pressure control device 40 to engage the clutch K0 and the starter clutch WSC together, and upon EV traveling in which the vehicle travels only by drive power of the motor MG, the clutch K0 is disengaged so as to cut off a transfer path between the engine 2 and the wheels 9.

[Details of the Transmission Mechanism]

Figure 2:
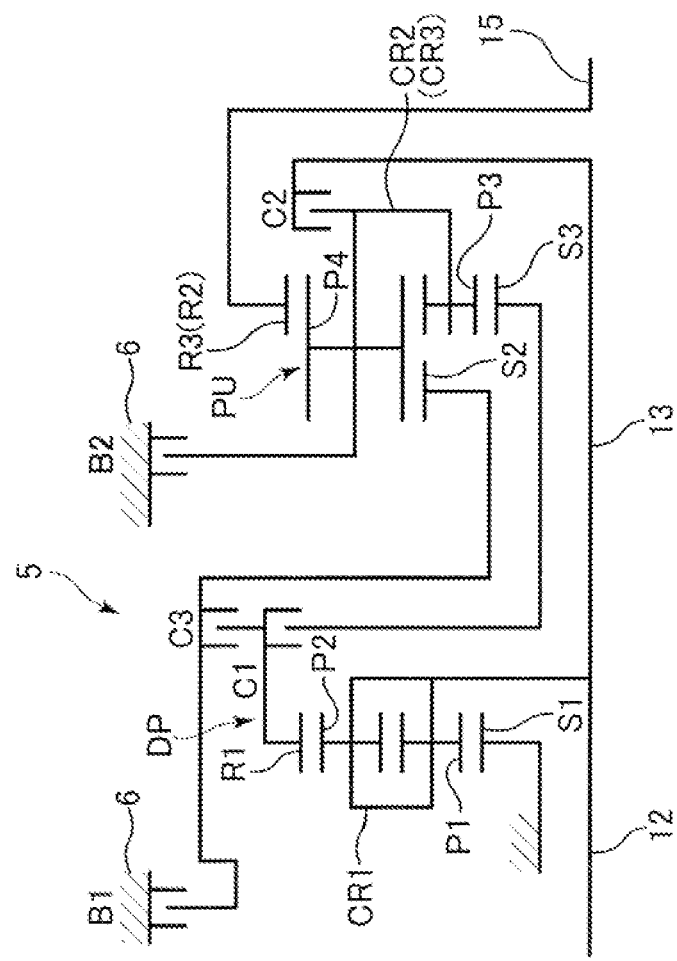
FIG. 2 is a skeleton diagram showing a transmission mechanism according to the present embodiment.

Next, the transmission mechanism 5 will be described using FIGS. 2 and 3. The transmission mechanism 5 includes a planetary gear DP and a planetary gear unit PU on the input shaft 12 which is an input member (and an intermediate shaft 13). The planetary gear DP is a so-called double-pinion planetary gear that includes a sun gear S1, a carrier CR1, and a ring gear R1 and has, on the carrier CR1, a pinion P1 that meshes with the sun gear S1 and a pinion P2 that meshes with the ring gear R1 such that the pinion P1 and the pinion P2 mesh together.

The sun gear S1 of the planetary gear DP is fixed to the case 6, and the carrier CR1 is connected to the input shaft 12, by which the carrier CR1 rotates together with the input shaft 12. Furthermore, by the fixed sun gear S1 and the carrier CR1 that rotates with the input shaft, the ring gear R1 has decelerated rotation in which input rotation is decelerated, and is connected to a first clutch C1 and a third clutch C3.

The planetary gear unit PU is a so-called Ravigneaux planetary gear that includes a sun gear S2, a sun gear S3, a carrier CR2 (CR3), and a ring gear R3 (R2) as four rotating elements and has, on the carrier CR2, a long pinion P4 that meshes with the sun gear S2 and the ring gear R3 and a short pinion P3 that meshes with the long pinion P4 and the sun gear S3 such that the long pinion P4 and the short pinion P3 mesh together.

The sun gear S2 of the planetary gear unit PU is connected to a first brake B1 and freely fixed to the case 6, and is connected to the third clutch C3, by which decelerated rotation of the ring gear R1 is freely inputted to the sun gear S2 through the third clutch C3. In addition, the sun gear S3 is connected to the first clutch C1, by which decelerated rotation of the ring gear R1 is freely inputted to the sun gear S3.

Furthermore, the carrier CR 2 is connected to a second clutch C2 to which rotation of the input shaft 12 is inputted through the intermediate shaft 13, by which input rotation is freely inputted to the carrier CR2 through the second clutch C2, and the carrier CR2 is connected to a second brake B2, by which rotation is freely fixed through the second brake B2. The ring gear R3 is connected to the output shaft 15 which is an output member that outputs rotation to the wheels 9.

Figure 3:
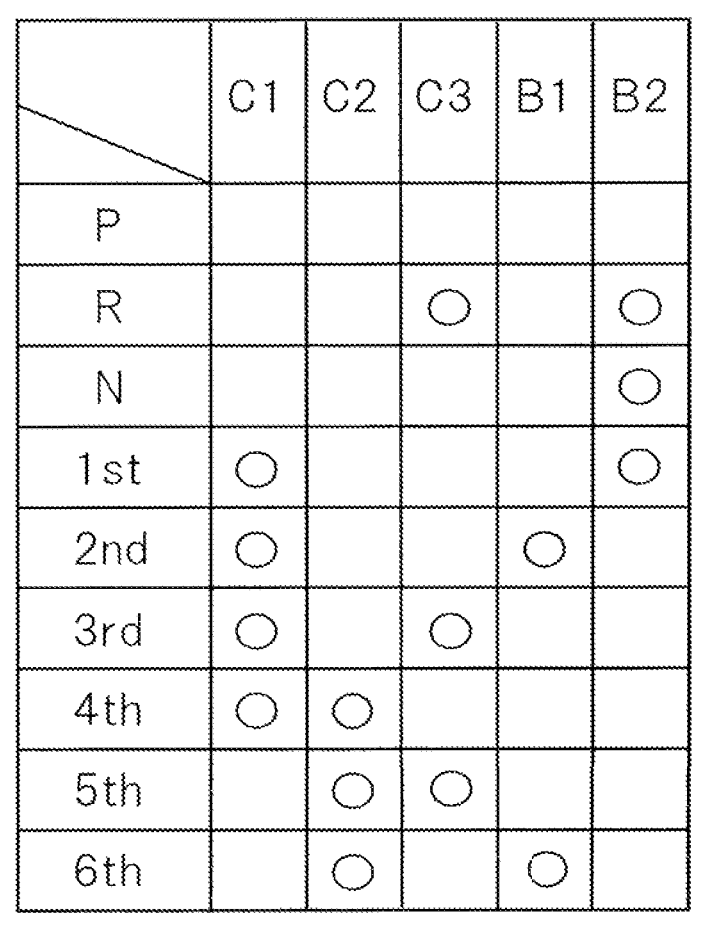

The transmission mechanism 5 configured in the above-described manner is controlled, using an electrical control signal of the control part (TCU) 31, by oil pressure which is supplied and discharged by the oil pressure control device 40, and achieves the transmission gear ratios (gear ratios) of the first forward gear (1st) to the sixth forward gear (6th) and a reverse gear (R) by engaging and disengaging the first clutch C1 to the third clutch C3 and the first brake B1 and the second brake B2 which are a plurality of friction engagement elements, in combinations shown in an engagement table of FIG. 3. Note that the second brake B2 is engaged in the first forward gear and the rear gear and is engaged in an N-range.

In addition, the TCU 31 determines a shift based on throttle opening angle, vehicle speed, and the like, and performs shift control by switching two friction engagement elements by controlling each solenoid valve included in the oil pressure control device 40. For example, upon performing a shift from the second forward gear to the third forward gear, the shift is performed by engaging the third clutch C3 while disengaging the first brake B1.

In this shift, first, the third clutch C3 which is a friction engagement element on an engaged side is slip-engaged while the first brake B1 which is a friction engagement element on a disengaged side is disengaged, going into a torque phase in which assignment of torque transfer is changed, and thereafter, the third clutch C3 is further engaged, by which a shift in which the rotation of the input shaft 12 of the transmission mechanism 5 actually changes proceeds, going into an inertia phase in which inertial toque is generated that changes an inertial force of a member drive-coupled to the input shaft 12 along with the rotational change. When the inertial torque is transferred from the output shaft 15 to the wheels 9, shift shock caused by torque fluctuations occurs, influencing shift feel. In addition, for example, in a so-called power-on upshift in which an upshift is performed with an accelerator pressed down, despite the fact that drive power is inputted to the input shaft 12 from the engine 2 and the motor MG, the rotational speed of the input shaft 12 needs to be reduced due to the upshift, and if large drive power is continuously outputted from the engine 2 and the motor MG in this state, then a reduction in the rotational speed of the input shaft 12 slows down, which may cause a delay in shift. Hence, as will be described below, torque reduction is performed in which torque is changed and reduced by at least one of the motor MG and the engine 2.

Note that although the following describes a case of performing torque reduction, for example, in a so-called power-off downshift in which a downshift is performed with vehicle speed reduced because the accelerator is not pressed down, torque increase is performed in which torque is changed so as to be increased in order to increase the rotational speed of the input shaft 12 along with the downshift. In addition, in a so-called power-on downshift in which a downshift is performed with the accelerator pressed down, friction engagement elements are engaged together at timing at which the transmission gear ratio reaches a post-shift transmission gear ratio by an increase in the rotational speed of the input shaft 12 by drive power of the motor MG and the engine 2, and thus, torque increase or torque reduction in an inertia phase is not performed, but torque reduction is performed for the purpose of reducing (smoothing out) sudden torque fluctuations caused by the engagement of the friction engagement elements. For these torque reduction and torque increase, torque change control performed during shift control which will be described below can be applied.

[Torque Change Control]

Figure 5:
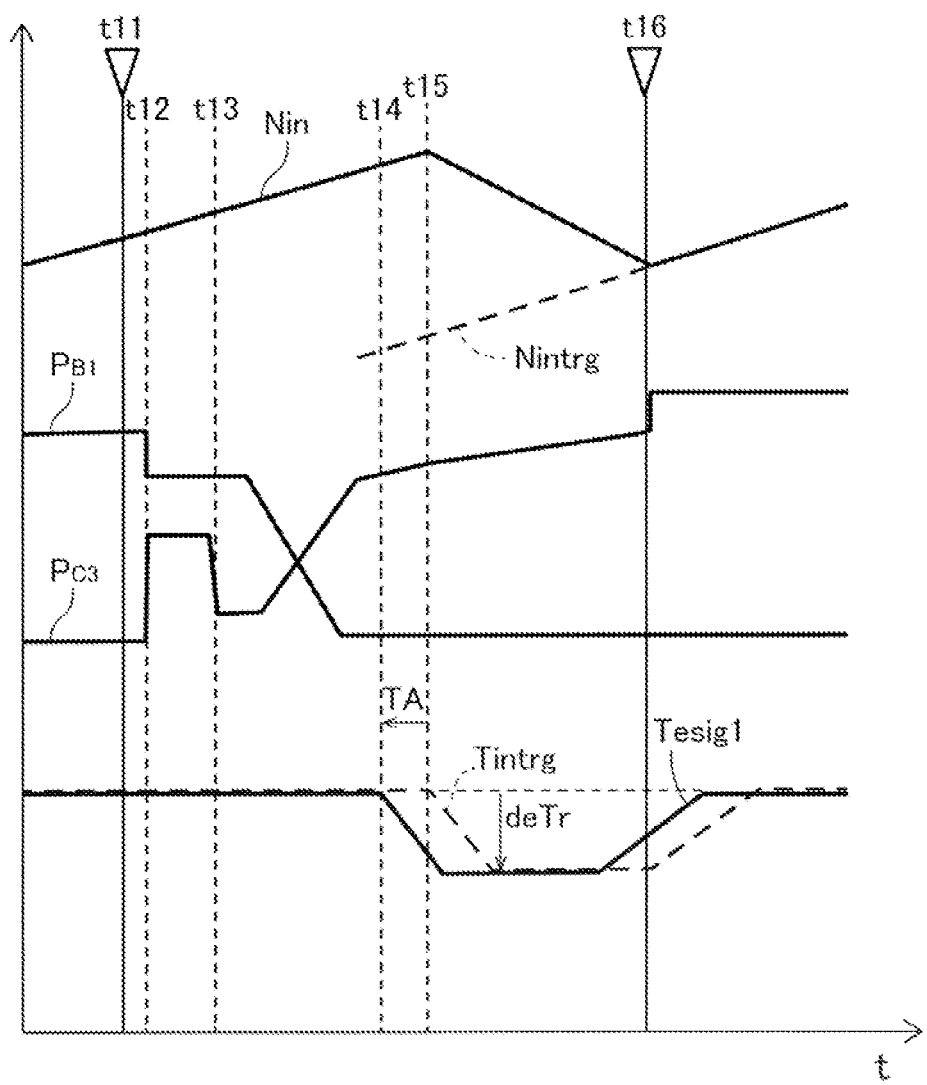
FIG. 5 is a time chart showing a case in which torque reduction is performed by an engine during shift control according to the present embodiment.
Figure 6:
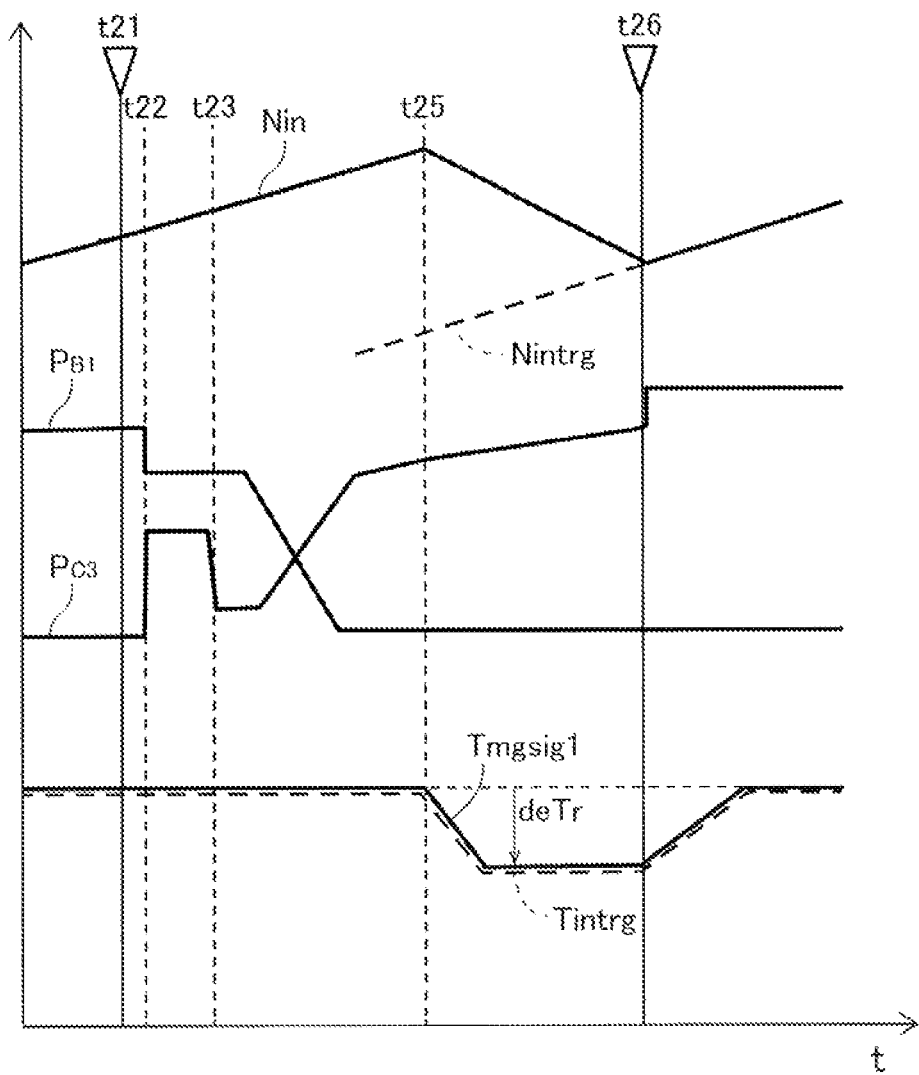
FIG. 6 is a time chart showing a case in which torque reduction is performed by a motor during shift control according to the present embodiment.

Next, torque change control by the motor MG and the engine 2 during shift control will be described using FIGS. 4 to 6. Note that the torque change control refers to control in which during shift control of the transmission mechanism 5, the TCU 31 changes output torque by performing torque reduction or torque increase on drive power outputted from the engine 2 and drive power outputted from the motor MG which are determined by the TCU 31 based on an accelerator pedal position, etc.

In a case of performing torque reduction by the motor MG, the torque reduction is performed by reducing output of drive power or increasing regeneration power. In a case of performing torque reduction by the engine 2, one of manners including retarding of ignition timing, changing of a throttle opening angle signal, cylinder deactivation, fuel cutoff, etc., is selectively performed. In a case of performing torque increase by the motor MG, the torque increase is performed by increasing output of drive power or reducing regeneration power. In a case of performing torque increase by the engine 2, one of manners including changing of a throttle opening angle signal, an increase of the amount of fuel to be injected, etc., is selectively performed.

Note that as shown in FIG. 1, when the TCU 31 changes output torque of the motor MG, drive of the motor MG is controlled such that torque Tmg of the motor MG is computed and a motor torque signal Tmgsig1 is outputted as a first rotating electrical machine instruction signal to the HV-ECU 60, and in response to the motor torque signal Tmgsig1, the HV-ECU 60 outputs a motor torque signal Tmgsig2 as a second rotating electrical machine instruction signal to the MCU 70, and the MCU 70 outputs a motor command signal MGcd as a rotating electrical machine drive signal for the motor MG. Note that specifically, the motor command signal is outputted to a drive circuit (not shown) that performs PWM control, and an inverter circuit (not shown) is controlled by the drive circuit performing pulse modulation in which motor torque according to the motor command signal is outputted, and a current is applied to the motor MG using electric power of the battery 50.

In addition, when the TCU 31 changes output torque of the engine 2, drive of the engine 2 is controlled such that torque Te of the engine 2 is computed and an engine torque signal Tesig1 is outputted as a first engine instruction signal to the HV-ECU 60, and in response to the engine torque signal Tesig1, the HV-ECU 60 outputs an engine torque signal Tesig2 as a second engine instruction signal to the ECU 80, and the ECU 80 outputs an engine command signal EGcd as an engine drive signal for the engine 2. Note that specifically, the engine command signal is a control signal for an injector or a spark plug of the engine 2, and particularly, when torque reduction is performed, retarding of ignition timing, changing of a throttle opening angle signal, cylinder deactivation, or fuel cutoff is performed.

In addition, a change time for motor torque (motor torque change time) which will be described below primarily indicates timing at which the TCU 31 outputs a motor torque signal Tmgsig1 (when the signal is continuously outputted, timing at which the content of the signal is changed and the change is outputted), but has substantially the same meaning as timing at which a motor torque signal Tmgsig2 is outputted (timing at which a change in the content of the signal is outputted) and timing that is an output time at which a motor command signal MGcd is outputted (timing at which a change in the content of the signal is outputted) because they are temporally substantially the same time as electrical control is performed.

In addition, likewise, a pre-change time at which an engine torque signal is outputted (engine torque change time) which will be described below primarily indicates timing at which the TCU 31 outputs an engine torque signal Tesig1 (when the signal is continuously outputted, timing at which the content of the signal is changed and the change is outputted), but has substantially the same meaning as timing at which an engine torque signal Tesig2 is outputted (timing at which a change in the content of the signal is outputted) and timing that is a pre-output time at which an engine command signal EGcd is outputted (timing at which a change in the content of the signal is outputted) because they are temporally substantially the same time as electrical control is performed.

Figure 4:
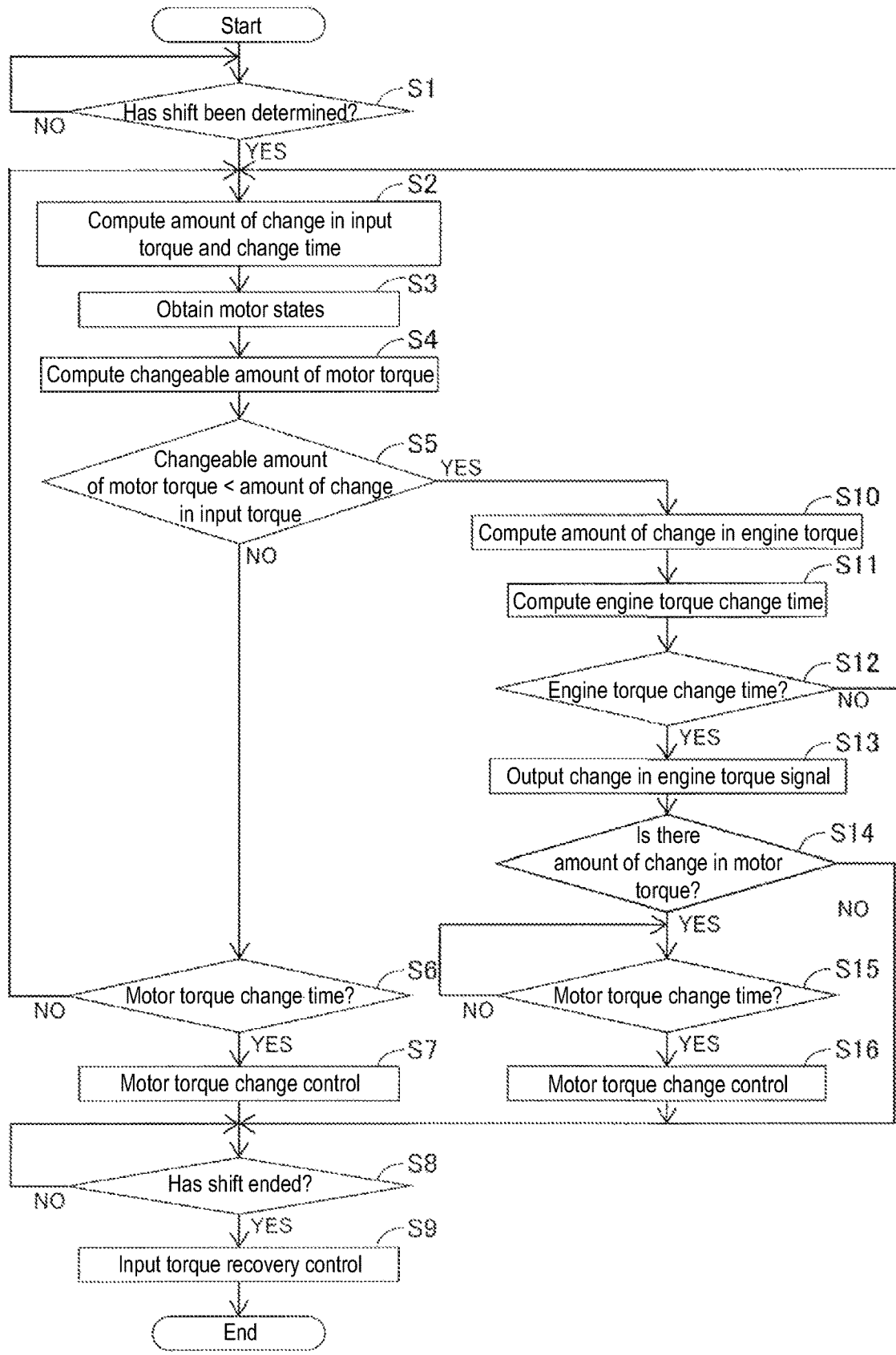
FIG. 4 is a flowchart showing torque change control during shift control according to the present embodiment.

As shown in FIG. 4, when the TCU 31 starts torque change control during shift control, first, the TCU 31 determines whether a shift determination has been made, by referring to a shift map (not shown) according to throttle opening angle, vehicle speed, and the like (S1), and waits until a shift determination has been made (NO at S1).

If a shift determination has been made by the TCU 31 (YES at S1), first, the amount of torque reduction or the amount of torque increase which is the amount of change in input torque to be inputted to the input shaft 12 (hereinafter, referred to as "amount of change in input torque") is computed according to the state of a shift for which the shift determination is made, i.e., the type of the shift such as whether the shift is a power-on shift with the accelerator pressed down, a power-off shift with the accelerator not pressed down, an upshift, or a downshift, the rotational speed of the input shaft 12, output torque (drive power) of the engine 2, and output torque (drive power) of the motor MG, and a change time at which a change in torque of those amounts starts is computed (S2). Note that specifically, the amount of torque reduction is an amount corresponding to inertial torque in a power-on upshift that is generated according to the amount of change in the rotational speed of the input shaft 12 determined based on transmission gear ratios before and after the shift and the current rotational speed of the input shaft 12, and the amount of torque increase is an amount corresponding to inertial torque in a power-off downshift that causes a change in the rotational speed of the input shaft 12 determined based on transmission gear ratios before and after the shift and the current rotational speed of the input shaft 12.

Then, the TCU 31 obtains environmental states regarding the motor MG (hereinafter, referred to as "motor states") (S3). Specifically, the TCU 31 obtains a current output (regeneration) state of the motor MG, the remaining level of the battery 50 (see FIG. 1), the temperature of the battery 50, the temperature of the motor MG, the temperature of the inverter circuit (not shown), etc. Namely, when the output (regeneration) state of the motor MG is on performance limitations of the motor MG or is a state close thereto, the motor MG cannot output (regenerate) anymore, and thus, output (regeneration) of the motor MG cannot be performed. In addition, when the remaining level of the battery 50 is a fully charged state, the battery 50 cannot be charged anymore, and thus, regeneration of the motor MG cannot be performed, and when the remaining level of the battery 50 is in a low-level state, output of drive power by the motor MG cannot be performed. In addition, when the temperature of the battery 50 is in a low-temperature state lower than a predetermined temperature, supplying or charging of electric power cannot be performed in the usual manner, and thus, drive-power output or regeneration by the motor MG is limited. In addition, when the temperature of the motor MG or the temperature of the inverter circuit is in a high-temperature state higher than a predetermined temperature, drive-power output or regeneration by the motor MG is limited in terms of protection of the motor MG or the inverter circuit. Then, based on the motor states thus obtained, the TCU 31 computes the amount of torque that can be changed by the motor MG (hereinafter, referred to as "changeable amount of motor torque") (S4). Namely, the changeable amount of motor torque changes whenever necessary, according to the motor states.

Then, the TCU 31 determines whether the changeable amount of motor torque computed at step S4 is smaller than the amount of change in input torque computed at step S2 (S5), i.e., determines whether the motor MG can perform the computed amount of torque reduction or the computed amount of torque increase. If the changeable amount of motor torque is greater than or equal to the amount of change in input torque (NO at S5), which in other words indicates that the motor MG can change torque by the amount of torque reduction or the amount of torque increase, then it is determined whether it is the change time for the input torque which is computed at the above-described step S2, i.e., whether it is a change time for the torque of the motor MG (hereinafter, referred to as "motor torque") (S6). Note that a torque change by the motor MG is electrically performed and thus there is almost no delay, i.e., the change time for the input torque and the change time for the motor torque have substantially the same meaning.

If, at step S6, it is not yet the change time for the motor torque (NO at S6), then processing returns to the above-described step S2, and computation of the amount of change in input torque and a change time, obtaining of motor states, and computation of the changeable amount of motor torque are redone. By this, for example, when the amount of pressing-down operation on the accelerator (accelerator pedal position) is changed by a driver after the shift determination has been made, the amount of change in input torque or the change time may be changed, but by thus returning to step S2 and redoing computation of the amount of change in input torque and a change time, the change in the amount of pressing-down operation on the accelerator can be handled. In addition, by redoing obtaining of motor states and computation of the changeable amount of motor torque after the shift determination has been made, a case can be handled in which the motor states have been changed before an actual motor torque change time has come. Thereafter, if the change time for the motor torque has come which is, for example, a time during a shift at which an inertia phase starts (YES at S6), then the TCU 31 performs motor torque change control in which the motor MG performs torque reduction or torque increase, by outputting a motor torque signal Tmgsig1 to the HV-ECU 60 so as to change the motor torque by the above-described computed amount of change in input torque (S7).

Then, it is waited until the TCU 31 determines that the shift has ended (NO at S8), e.g., it is determined that the transmission gear ratio has reached a post-shift transmission gear ratio (or it is determined that a set shift time has timed out), and if the TCU 31 determines that the shift has ended (YES at S8), then the amount of change in torque performed by the motor torque control is gradually brought back, i.e., input torque recovery control is performed in which the torque reduction or torque increase is terminated while the torque reduction or torque increase is swept with a predetermined gradient (S9), by which the torque change control during shift control by the motor MG ends.

On the other hand, if, at step S5, the TCU 31 determines that the changeable amount of motor torque is smaller than the amount of change in input torque (YES at S5), i.e., determines that the motor MG cannot change (is unable to change) torque of the computed amount of torque reduction or the computed amount of torque increase, first, the TCU 31 computes the amount of change by which the engine 2 changes torque (hereinafter, referred to as "amount of change in engine torque") (S10). The amount of change in engine torque is computed by subtracting the above-described changeable amount of motor torque from the above-described amount of change in input torque, i.e., while a torque change by the motor MG is prioritized, computation for changing torque by the engine 2 is performed. Note that when the motor MG cannot change torque due to the motor states, only a torque change by the engine 2 is performed, and thus, in this case, computation is performed such that the amount of change in engine torque is identical to the amount of change in input torque.

Subsequently, the TCU 31 computes a pre-change time at which the torque of the engine 2 is changed earlier than the input torque change time (hereinafter, referred to as "engine torque change time") (S11). Namely, for example, based on the state of the engine 2 obtained by communicating with a control part of the engine 2 or a control part of the vehicle, the TCU 31 determines a manner used when torque reduction or torque increase by the engine 2 is performed, computes, according to the manner, required time from when a signal for a torque change is outputted to the engine 2 to when the engine torque is actually changed, and computes an engine torque change time which is a pre-change time earlier by the required time than an inertia phase start time (i.e., the same meaning as a motor torque change time in a case of changing torque by the motor MG).

Note that as described above, the manners used upon performing torque reduction include retarding of ignition timing, changing of a throttle opening angle signal, cylinder deactivation, fuel cutoff, etc., and depending on the model of the engine 2, though, for example, the above-described required time is relatively shorter in retarding of ignition timing (what is called a fast response) than in other manners, and the above-described required time is long in fuel cutoff, changing of a throttle opening angle signal, and cylinder deactivation. In addition, the manners used upon performing torque increase include changing of a throttle opening angle signal and an increase of the amount of fuel to be injected, and depending on the model of the engine 2, though, for example, the above-described required time is relatively shorter in an increase of the amount of fuel to be injected than in other manners, and the above-described required time is long in changing of a throttle opening angle signal.

Subsequently, it is determined whether it is the engine torque change time computed at the above-described step S11 (S12), and if it is not yet the engine torque change time (NO at S12), then processing returns to the above-described step S2, and computation of the amount of change in input torque and a change time, obtaining of motor states, computation of the changeable amount of motor torque, computation of the amount of change in engine torque, and an engine torque change time are redone. By this, during a period from when a shift determination has been made until an actual engine torque change time has come, a determination as to whether the changeable amount of motor torque is smaller than the amount of change in input torque is computed whenever necessary, by which a case in which the motor states have been changed can be handled. Thereafter, if the engine torque change time has come (YES at S12), then the TCU 31 outputs an engine torque signal Tesig1 to the HV-ECU 60 (S13).

In addition, after outputting the engine torque signal Tesig1 to the HV-ECU 60, the TCU 31 determines whether there has been an amount of change in motor torque upon computing the amount of change in engine torque at the above-described step S10 (S14), i.e., determines whether torque reduction or torque increase is performed only by a torque change by the engine 2 or by a torque change by the engine 2 and the motor MG. If there is no amount of change in motor torque (NO at S14), i.e., if a torque change is performed only by the engine 2, then it is just waited until the end of the shift (NO at S8), and if it is determined that the shift has ended (YES at S8), then the amount of change in torque performed by the torque change by the engine 2 using the engine torque signal Tesig1 is gradually brought back, i.e., input torque recovery control is performed in which the torque reduction or torque increase is terminated while the torque reduction or torque increase is swept with a predetermined gradient (S9), by which the torque change control during shift control by the engine 2 ends.

On the other hand, if it is determined at the above-described step S14 that there is an amount of change in motor torque (YES at S14), i.e., if a torque change is performed by the engine 2 and the motor MG, then it is waited until the motor torque change time has come (NO at S15), and if the motor torque change time has come (YES at S15), then motor torque change control is performed in which torque reduction or torque increase by the motor MG is performed in cooperation with the engine 2, by outputting a motor torque signal Tmgsig1 to the HV-ECU 60 so that the above-described amount of change in input torque is obtained by the amount of change in motor torque in addition to the above-described amount of change in engine torque (S16). Then, it is just waited until the end of the shift (NO at S8), and if it is determined that the shift has ended (YES at S8), then the amount of change in torque of the engine 2 and the amount of change in torque of the motor MG are gradually brought back, i.e., input torque recovery control is performed in which the torque reduction or torque increase is terminated while the torque reduction or torque increase is swept with a predetermined gradient (S9), by which the torque change control during shift control by the engine 2 and the motor MG ends.

[Exemplary Travel in Torque Reduction by the Motor]

Next, as an example of torque change control, a case in which torque reduction is performed by the motor MG during shift control for a power-on upshift gear change from the second forward gear to the third forward gear will be described using FIG. 6.

When the transmission mechanism 5 is in the second forward gear, the first clutch C1 and the first brake B1 are engaged together and the third clutch C3 is disengaged, and thus, the transmission mechanism 5 is in a state in which engagement pressure $P_{B1}$ for the first brake B1 is supplied and an engagement pressure $P_{C3}$ for the third clutch C3 is not supplied. In addition, a motor torque signal Tmgsig1 to the HV-ECU 60 is outputted so as to obtain motor torque for outputting drive power determined according to the accelerator pedal position.

The vehicle speed of the vehicle increases and the rotational speed Nin of the input shaft 12 increases, and at time point t21, the TCU 31 determines an upshift gear change to the third forward gear according to the vehicle speed and the throttle opening angle (YES at S1). Then, in torque change control during the above-described shift control, inertial torque in an inertia phase is computed based on the rotational speed Nin of the input shaft 12, and the amount of change in input torque deTr which is the amount of torque reduction and a change time (time point t25) are computed (S2). In addition, motor states are obtained (S3) and the changeable amount of motor torque is also computed (S4). In this exemplary travel, the changeable amount of motor torque is greater than the amount of change in input torque (NO at S5), and thus, it is waited until the change time for the motor torque has come (NO at S6).

On the other hand, at time point t22, shift control starts, and the engagement pressure $P_{B1}$ for the first brake B1 drops, and a fast-fill instruction is provided for backlash elimination of a hydraulic servo so as to increase the engagement pressure $P_{C3}$ for the third clutch C3, and at time point t23, the fast-fill instruction ends and the engagement pressure $P_{C3}$ for the third clutch C3 temporarily drops. Thereafter, the engagement pressure $P_{B1}$ for the first brake B1 further drops and the engagement pressure $P_{C3}$ for the third clutch C3 rises, by which the first brake B1 is disengaged and the third clutch C3 is slip-engaged, going into a torque phase in which torque transfer assigned to the first brake B1 is transferred to assignment of the third clutch C3. Then, at time point t25, the engagement pressure $P_{C3}$ for the third clutch C3 gradually rises, by which the amount of slip in the slip engagement of the third clutch C3 decreases, starting an inertia phase in which the transmission gear ratio of the transmission mechanism 5 changes.

Then, the TCU 31 determines that it is the motor torque change time (S6), and performs motor torque change control so as to obtain target input torque Tintrg at which the above-described computed amount of change in input torque deTr is achieved, by gradually sweeping down the motor torque using the motor torque signal Tmgsig1 (S7).

Thereafter, when the actual shift proceeds and an input shaft rotational speed sensor (not shown) or the like detects that the rotational speed Nin of the input shaft 12 has reached a post-shift target rotational speed Nintrg determined based on the transmission gear ratio of the third forward gear, at time point t26, it is determined that the shift has ended (YES at S8), and the engagement pressure $P_{C3}$ for the third clutch C3 rises to full engagement pressure, completing the upshift gear change from the second forward gear to the third forward gear. Then, input torque recovery control (S9) is performed in which the target input torque Tintrg is gradually swept up, and accordingly, the motor torque signal Tmgsig1 is also gradually swept up, by which the torque change control during the shift control ends.

[Exemplary Travel in Torque Reduction by the Engine]

Next, as an example of torque change control, a case in which torque reduction is performed by the engine 2 during shift control for a power-on upshift gear change from the second forward gear to the third forward gear because the motor MG cannot be used due to a motor state (e.g., a state in which regeneration cannot be performed because the battery 50 is in a fully charged state) will be described using FIG. 5.

Likewise, when the transmission mechanism 5 is in the second forward gear, the first clutch C1 and the first brake B1 are engaged together and the third clutch C3 is disengaged, and thus, the transmission mechanism 5 is in a state in which engagement pressure $P_{B1}$ for the first brake B1 is supplied and an engagement pressure $P_{C3}$ for the third clutch C3 is not supplied. In addition, a motor torque signal Tmgsig1 to the HV-ECU 60 is outputted so as to obtain motor torque for outputting drive power determined according to the accelerator pedal position.

The vehicle speed of the vehicle increases and the rotational speed Nin of the input shaft 12 increases, and at time point t11, the TCU 31 determines an upshift gear change to the third forward gear according to the vehicle speed and the throttle opening angle (YES at S1). Then, likewise, in torque change control during the above-described shift control, inertial torque in an inertia phase is computed based on the rotational speed Nin of the input shaft 12, and the amount of change in input torque deTr which is the amount of torque reduction and a change time (time point t15) are computed (S2). In addition, motor states are obtained (S3) and the changeable amount of motor torque is also computed (S4). In this exemplary travel, the changeable amount of motor torque is 0 and smaller than the amount of change in input torque (YES at S5), and thus, the amount of change in engine torque is computed (S10) and furthermore an engine torque change time is computed (S11), and it is waited until the engine torque change time has come (NO at S12).

On the other hand, at time point t12, shift control starts, and the engagement pressure $P_{B1}$ for the first brake B1 drops, and a fast-fill instruction is provided so as to increase the engagement pressure $P_{C3}$ for the third clutch C3, and at time point t13, the fast-fill instruction ends and the engagement pressure $P_{C3}$ for the third clutch C3 temporarily drops. Thereafter, the engagement pressure $P_{B1}$ for the first brake B1 further drops and the engagement pressure $P_{C3}$ for the third clutch C3 rises, by which the first brake B1 is disengaged and the third clutch C3 is slip-engaged, going into a torque phase in which torque transfer assigned to the first brake B1 is transferred to assignment of the third clutch C3.

When, at time point t14 during the torque phase, an engine torque change time which is earlier by time TA required to change the engine torque than time point t15 which is an inertia phase start time has come (YES at S12), the TCU 31 outputs an instruction to the engine 2 so that, for example, the amount of change in engine torque reaches the amount of change in input torque deTr by retarding ignition timing, using an engine torque signal Tesig1 (S13). On the other hand, at time point t15, the engagement pressure $P_{C3}$ for the third clutch C3 gradually rises, by which the amount of slip in the slip engagement of the third clutch C3 decreases, starting an inertia phase in which the transmission gear ratio of the transmission mechanism 5 changes.

In addition, at time point t15, since, as described above, the engine torque signal Tesig1 has already been instructed, the torque of the engine 2 actually starts to be swept down, and torque reduction of the engine 2 is performed in accordance with a time for target input torque Tintrg at which the above-described computed amount of change in input torque deTr is achieved. Note that in this exemplary travel, since there is no amount of change in motor torque (NO at S14), the engine torque signal Tesig1 is outputted so as to continue the torque reduction of the engine 2 until the end of the shift, and the engine 2 is instructed to sweep up the engine torque signal Tesig1 so as to start termination of the torque reduction of the engine 2 in accordance with the end of the inertia phase, i.e., the end of the shift.

Thereafter, when the actual shift proceeds and an input shaft rotational speed sensor (not shown) or the like detects that the rotational speed Nin of the input shaft 12 has reached a post-shift target rotational speed Nintrg determined based on the transmission gear ratio of the third forward gear, at time point t16, it is determined that the shift has ended (YES at S8), and the engagement pressure $P_{C3}$ for the third clutch C3 rises to full engagement pressure, completing the upshift gear change from the second forward gear to the third forward gear. Then, input torque recovery control (S9) is performed in which the target input torque Tintrg is gradually swept up, but before that, the engine torque signal Tesig1 is outputted so as to be swept up, by which the output torque of the engine 2 is also actually gradually swept up, by which the torque change control during the shift control ends.

As such, by outputting an engine torque signal Tesig1 to the HV-ECU 60 at an engine torque change time which is earlier by time TA required for the engine 2 to change torque than an input torque change time (i.e., a motor torque change time in a case of performing a torque change by the motor MG), it becomes possible to change engine torque acting on the transmission mechanism 5, at the input torque change time which is an inertia phase start time, enabling a reduction in a delay in shift and influence on shift feel.

Summary of the Present Embodiment

The hybrid drive device (1) includes:

a transmission mechanism (S) that has an input member (12) drive-coupled to an engine (2) and an output member (15) drive-coupled to wheels (9), and performs shift control for changing a transmission gear ratio between the input member (12) and the output member (15);

a rotating electrical machine (MG) drive-coupled to the transmission mechanism (5); and a control part (31) that, during shift control of the transmission mechanism (S), computes a change time and an amount of change by which drive power acting on the transmission mechanism (S) is changed, controls the rotating electrical machine (MG) so that drive power of the rotating electrical machine (MG) is changed by the amount of change (deTr), when the rotating electrical machine (MG) can change drive power by the amount of change (deTr), and outputs an engine instruction signal (Tesig1) for changing drive power to the engine (2), when the rotating electrical machine (MG) cannot change drive power by the amount of change (deTr), and when the rotating electrical machine (MG) cannot change drive power by the amount of change (deTr), the control part (31) outputs the engine instruction signal (Tesig1) to the engine (2) at a pre-change time (t14) earlier than a change time (t15) at which drive power of the rotating electrical machine (MG) is changed when the rotating electrical machine (MG) can change drive power by the amount of change (deTr).

By this, when the motor MG cannot change motor torque by the amount of change in input torque, an engine torque signal Tesig1 is outputted to the engine 2 at an engine torque change time earlier than an input torque change time at which drive power of the motor MG is changed when the motor MG can change the amount of change in input torque, and thus, it becomes possible for the engine 2 to change input torque acting on the transmission mechanism 5 at a computed input torque change time, enabling a reduction in a delay in shift and influence on shift feel.

In addition, in the hybrid drive device (1), the control part (31)

outputs, when the rotating electrical machine (MG) can change drive power by the amount of change (deTr), a rotating electrical machine instruction signal (Tmgsig1) for changing drive power to the rotating electrical machine (MG) at the change time (t15) so that drive power of the rotating electrical machine (MG) is changed by the amount of change (deTr), and outputs, when the rotating electrical machine (MG) cannot change drive power by the amount of change (deTr), the engine instruction signal (Tesig1) to the engine (2) at the pre-change time (t14) earlier than the change time (t15) at which the rotating electrical machine instruction signal (Tmgsig1) is outputted.

By this, when the motor MG cannot change motor torque by the amount of change in input torque, an engine torque signal Tesig1 is outputted to the engine 2 at an engine torque change time earlier than an input torque change time at which a motor torque signal Tmgsig1 is outputted when the motor MG can change the amount of change in input torque, and thus, it becomes possible for the engine 2 to change input torque acting on the transmission mechanism 5 at a computed input torque change time, enabling a reduction in a delay in shift and influence on shift feel.

In addition, in the hybrid drive device (1)

the control part is a first control part (31), the rotating electrical machine instruction signal is a first rotating electrical machine instruction signal (Tmgsig1), the engine instruction signal is a first engine instruction signal (Tesig1), the first control part (31) can output the first rotating electrical machine instruction signal (Tmgsig1) and the first engine instruction signal (Tesig1) to a fourth control part (60) that outputs a second rotating electrical machine instruction signal (Tmgsig2) to a second control part (70) and outputs a second engine instruction signal (Tesig2) to a third control part (80) that outputs an engine drive signal (EGcd) for controlling drive of the engine (2), the second control part (70) outputting a rotating electrical machine drive signal (MGcd) for controlling drive of the rotating electrical machine (MG), and when the rotating electrical machine (MG) cannot change drive power by the amount of change (deTr), an engine drive signal (EGcd) for changing drive power is outputted to the engine (2) from the third control part (80) at a pre-output time earlier than an output time at which a rotating electrical machine drive signal (MGcd) for changing drive power is outputted to the rotating electrical machine (MG) from the second control part (70) when the rotating electrical machine (MG) can change drive power by the amount of change (deTr).

By this, when the motor MG cannot change motor torque by the amount of change in input torque, an engine command signal EGcd is outputted to the engine 2 at an engine command output time earlier than a motor command output time at which a motor command signal MGcd is outputted from the motor control part 70 when the motor MG can change the amount of change in input torque, and thus, it becomes possible for the engine 2 to change input torque acting on the transmission mechanism 5 at a computed input torque change time, enabling a reduction in a delay in shift and influence on shift feel.

In addition, in the hybrid drive device (1), the pre-change time (t14) is earlier by time (TA) required for the engine (2) to change drive power than a change time (t14) at which drive power of the rotating electrical machine (MG) is changed when the rotating electrical machine (MG) can change drive power by the amount of change (deTr).

By this, the engine 2 can change input torque acting on the transmission mechanism 5 at a computed input torque change time.

In addition, in the hybrid drive device (1), during shift control of the transmission mechanism (S), the control part (31) computes whenever necessary whether the rotating electrical machine (MG) can change drive power by the amount of change (deTr), and determines, at the pre-change time (t14), that the rotating electrical machine cannot change drive power by the amount of change (deTr).

By this, a determination as to whether the motor MG can change torque by the amount of change in input torque deTr is computed whenever necessary, i.e., the changeable amount of motor torque is computed and a determination as to whether the changeable amount of motor torque is smaller than the amount of change in input torque is computed whenever necessary, and thus, it can be determined at an engine torque change time that the motor MG cannot change the amount of change in input torque deTr, i.e., it is possible to output an engine torque signal to the engine 2 at the engine torque change time earlier than an input torque change time.

In addition, in the hybrid drive device (1), the control part determines a manner used when the engine changes drive power, and sets different pre-change times (t14) for different manners.

By this, by setting different engine torque change times for different manners used to perform a torque change by the engine 2, regardless of how a torque change by the engine 2 is performed, a time at which the engine torque is actually changed can be adjusted to an input torque change time.

In the hybrid drive device (1), the transmission mechanism (S) has a gear mechanism (DP, PU) and a plurality of friction engagement elements (C1, C2, C3, B1, B2) that change a transfer path of the gear mechanism (DP, PU), and performs the shift control by switching at least two of the plurality of friction engagement elements (C1, C2, C3, B1, B2), the change time (t15) is a start time of an inertia phase in which a rotational change in the shift control occurs, and the pre-change time (t14) is before a start of the inertia phase.

By this, inertial torque occurring during shift control of the transmission mechanism 5 can be absorbed without delay caused by a torque change by the engine 2.

Possibility of Other Embodiments

Note that although in the present embodiment described above, as an example of a hybrid drive device, a so-called parallel hybrid drive device 1 is described in which the transmission mechanism 5 changes the speed of driving rotation of the engine 2 and the motor MG, the configuration is not limited thereto, and any hybrid drive device may be used as long as the hybrid drive device is such that a transmission mechanism that performs a shift using engine's driving rotation as input rotation and a motor can change torque acting on the transmission mechanism. For example, the motor may be configured to be drive-coupled to an output shaft of the transmission mechanism, and particularly, a configuration may be adopted in which two or more motors are provided, and the speed of output rotation of an engine and a motor is changed, and the other motor changes torque of the output shaft of the transmission mechanism.

In addition, although the present embodiment describes that upon changing output torque of the engine 2 and the motor MG, the TCU 31 computes engine torque and motor torque and generates and outputs an engine torque signal Tesig1 and a motor torque signal Tmgsig1, the configuration is not limited thereto, and for example, the TCU 31 may instruct the HV-ECU 60 to change total torque of the engine 2 and the motor MG, and the HV-ECU 60 may compute engine torque and motor torque, and generate and output an engine torque signal and a motor torque signal.

In addition, although the present embodiment describes that an engine torque signal Tesig1 is outputted to the engine 2 earlier by time TA required for the engine 2 to change torque than when the motor MG changes drive power, the configuration is not limited thereto, and if the engine torque signal Tesig1 can be outputted earlier even by a small amount of time than when the motor MG changes drive power, then a reduction in a delay in shift and influence on shift feel, though the amount of the reduction is small, can be achieved.

In addition, although the present embodiment describes that torque reduction or torque increase can also be performed by the motor and the engine cooperating with each other, when torque reduction or torque increase cannot be performed only by the motor, torque reduction or torque increase may be performed by switching only to the engine.

In addition, although the present embodiment describes that the changeable amount of motor torque is computed whenever necessary based on motor states, the configuration is not limited thereto, and upon starting a shift (upon determining a shift), a determination as to whether a torque change is performed by the motor, by the engine, or by the motor and the engine cooperating with each other may be made first, and then the torque change may be performed during shift control.

In addition, although the present embodiment describes that a shift determination is made and then the changeable amount of motor torque is computed based on motor states, in a hybrid vehicle, during normal travel, the state of a battery and the state of a motor are monitored whenever necessary and assignments of drive power of an engine and the motor are computed, and thus, based on those pieces of information, the changeable amount of motor torque may be computed irrespective of the start of a shift.

In addition, although the present embodiment describes that the transmission mechanism 5 is a stepped transmission mechanism and torque reduction or torque increase is performed in an inertia phase in a shift in which the friction engagement elements are switched, the configuration is not limited thereto, and even when a continuously variable transmission mechanism is used, a torque change may be performed so as to absorb inertial torque occurring according to a shift, and furthermore, in order to suppress not only inertial torque but also shift shock or the rev-up of the engine, torque reduction or torque increase may be performed.

INDUSTRIAL APPLICABILITY

The hybrid drive device can be used as a hybrid drive device mounted on a vehicle, and particularly, the hybrid drive device is suitable for use in a vehicle that seeks prevention of a delay in shift or prevention of influence on shift feel when a rotating electrical machine cannot change drive power by the amount of change.

REFERENCE SIGNS LIST

1: Hybrid drive device, 2: Engine, 5: Transmission mechanism, 9: Wheel, 12: Input member (input shaft), 15: Output member (output shaft), 31: Control part, first control part (TCU), 60: Fourth control part (HV-ECU), 70: Second control part (MCU), 80: Third control part (ECU), MG: Rotating electrical machine (motor), TA: Required time, t14: Pre-change time, t15: Change time, deTr: Amount of change (amount of change in input torque), DP: Gear mechanism (planetary gear), PU: Gear mechanism (planetary gear unit), C1: Friction engagement element (first clutch), C2: Friction engagement element (second clutch), C3: Friction engagement element (third clutch), B1: Friction engagement element (first brake), B2: Friction engagement element (second brake), EGcd: Engine drive signal (engine command signal), MGcd: Rotating electrical machine drive signal (motor command signal), Tesig1: Engine instruction signal, first engine instruction signal (engine torque signal), Tesig2: Second engine instruction signal (engine torque signal), Tmgsig1: Rotating electrical machine instruction signal, first rotating electrical machine instruction signal (motor torque signal), and Tmgsig2: Second rotating electrical machine instruction signal (motor torque signal)

The invention claimed is:

1. A hybrid drive device comprising:
   a transmission mechanism that has an input member drive-coupled to an engine and an output member drive-coupled to wheels, and performs shift control for changing a transmission gear ratio between the input member and the output member;
   a rotating electrical machine drive-coupled to the transmission mechanism; and
   a control part that, during shift control of the transmission mechanism, computes a change time and an amount of change by which drive power acting on the transmission mechanism is changed, controls the rotating electrical machine so that drive power of the rotating electrical machine is changed by the amount of change, when the rotating electrical machine can change drive power by the amount of change, and outputs an engine instruction signal for changing drive power to the engine, when the rotating electrical machine cannot change drive power by the amount of change,
   wherein
   when the rotating electrical machine cannot change drive power by the amount of change, the control part outputs the engine instruction signal to the engine at a pre-change time earlier than a change time at which drive power of the rotating electrical machine is changed when the rotating electrical machine can change drive power by the amount of change.

2. The hybrid drive device according to claim 1, wherein the control part
   outputs, when the rotating electrical machine can change drive power by the amount of change, a rotating electrical machine instruction signal for changing drive power to the rotating electrical machine at the change time so that drive power of the rotating electrical machine is changed by the amount of change, and
   outputs, when the rotating electrical machine cannot change drive power by the amount of change, the engine instruction signal to the engine at the pre-change time earlier than the change time at which the rotating electrical machine instruction signal is outputted.

3. The hybrid drive device according to claim 2, wherein the control part is a first control part,
   the rotating electrical machine instruction signal is a first rotating electrical machine instruction signal,
   the engine instruction signal is a first engine instruction signal,
   the first control part can output the first rotating electrical machine instruction signal and the first engine instruction signal to a fourth control part that outputs a second rotating electrical machine instruction signal to a second control part and outputs a second engine instruction signal to a third control part that outputs an engine drive signal for controlling drive of the engine, the second control part outputting a rotating electrical machine drive signal for controlling drive of the rotating electrical machine, and
   when the rotating electrical machine cannot change drive power by the amount of change, an engine drive signal for changing drive power is outputted to the engine from the third control part at a pre-output time earlier than an output time at which a rotating electrical machine drive signal for changing drive power is outputted to the rotating electrical machine from the second control part when the rotating electrical machine can change drive power by the amount of change.

4. The hybrid drive device according to claim 1, wherein the pre-change time is earlier by time required for the engine to change drive power than a change time at which drive power of the rotating electrical machine is changed when the rotating electrical machine can change drive power by the amount of change.

5. The hybrid drive device according to claim 1, wherein during shift control of the transmission mechanism, the control part computes whenever necessary whether the rotating electrical machine can change drive power by the amount of change, and determines, at the pre-change time, that the rotating electrical machine cannot change drive power by the amount of change.

6. The hybrid drive device according to claim 1, wherein the control part determines a manner used when the engine changes drive power, and sets different pre-change times for different manners.

7. The hybrid drive device according to claim 1, wherein
   the transmission mechanism has a gear mechanism and a plurality of friction engagement elements that change a transfer path of the gear mechanism, and performs the shift control by switching at least two of the plurality of friction engagement elements,
   the change time is a start time of an inertia phase in which a rotational change in the shift control occurs, and
   the pre-change time is before a start of the inertia phase.

8. The hybrid drive device according to claim 2, wherein the pre-change time is earlier by time required for the engine to change drive power than a change time at which drive power of the rotating electrical machine is changed when the rotating electrical machine can change drive power by the amount of change.

9. The hybrid drive device according to claim 3, wherein the pre-change time is earlier by time required for the engine to change drive power than a change time at which drive power of the rotating electrical machine is changed when the rotating electrical machine can change drive power by the amount of change.

10. The hybrid drive device according to claim 3, wherein during shift control of the transmission mechanism, the control part computes whenever necessary whether the rotating electrical machine can change drive power by the amount of change, and determines, at the pre-change time, that the rotating electrical machine cannot change drive power by the amount of change.

11. The hybrid drive device according to claim 9, wherein during shift control of the transmission mechanism, the control part computes whenever necessary whether the rotating electrical machine can change drive power by the amount of change, and determines, at the pre-change time, that the rotating electrical machine cannot change drive power by the amount of change.

12. The hybrid drive device according to claim 3, wherein the control part determines a manner used when the engine changes drive power, and sets different pre-change times for different manners.

13. The hybrid drive device according to claim 11, wherein the control part determines a manner used when the engine changes drive power, and sets different pre-change times for different manners.

14. The hybrid drive device according to claim 2, wherein
   the transmission mechanism has a gear mechanism and a plurality of friction engagement elements that change a transfer path of the gear mechanism, and performs the shift control by switching at least two of the plurality of friction engagement elements, the change time is a start time of an inertia phase in which a rotational change in the shift control occurs, and the pre-change time is before a start of the inertia phase.

15. The hybrid drive device according to claim 3, wherein the transmission mechanism has a gear mechanism and a plurality of friction engagement elements that change a transfer path of the gear mechanism, and performs the shift control by switching at least two of the plurality of friction engagement elements, the change time is a start time of an inertia phase in which a rotational change in the shift control occurs, and the pre-change time is before a start of the inertia phase.

16. The hybrid drive device according to claim 4, wherein the transmission mechanism has a gear mechanism and a plurality of friction engagement elements that change a transfer path of the gear mechanism, and performs the shift control by switching at least two of the plurality of friction engagement elements, the change time is a start time of an inertia phase in which a rotational change in the shift control occurs, and the pre-change time is before a start of the inertia phase.

17. The hybrid drive device according to claim 5, wherein the transmission mechanism has a gear mechanism and a plurality of friction engagement elements that change a transfer path of the gear mechanism, and performs the shift control by switching at least two of the plurality of friction engagement elements, the change time is a start time of an inertia phase in which a rotational change in the shift control occurs, and the pre-change time is before a start of the inertia phase.

18. The hybrid drive device according to claim 6, wherein the transmission mechanism has a gear mechanism and a plurality of friction engagement elements that change a transfer path of the gear mechanism, and performs the shift control by switching at least two of the plurality of friction engagement elements, the change time is a start time of an inertia phase in which a rotational change in the shift control occurs, and the pre-change time is before a start of the inertia phase.

19. The hybrid drive device according to claim 9, wherein the transmission mechanism has a gear mechanism and a plurality of friction engagement elements that change a transfer path of the gear mechanism, and performs the shift control by switching at least two of the plurality of friction engagement elements, the change time is a start time of an inertia phase in which a rotational change in the shift control occurs, and the pre-change time is before a start of the inertia phase.

20. The hybrid drive device according to claim 13, wherein the transmission mechanism has a gear mechanism and a plurality of friction engagement elements that change a transfer path of the gear mechanism, and performs the shift control by switching at least two of the plurality of friction engagement elements, the change time is a start time of an inertia phase in which a rotational change in the shift control occurs, and the pre-change time is before a start of the inertia phase.

* * * * *